United States Patent [19]

Seim et al.

[11] 3,832,494

[45] Aug. 27, 1974

[54] SIGNAL MULTIPLEXER AND DEMULTIPLEXER

[75] Inventors: Howard N. Seim, Minneapolis, Minn.; Neal E. Roebke, Greendale, Wis.

[73] Assignee: Control Data Corporation, Minneapolis, Minn.

[22] Filed: June 10, 1970

[21] Appl. No.: 32,496

[52] U.S. Cl. ............ 179/15 BA, 179/15 BM, 178/6

[51] Int. Cl. ............................................ H04j 1/08

[58] Field of Search ...... 179/15 BA, 15 BM, 15 BT, 179/15 AE; 178/68, 6; 340/171, 172

[56] References Cited

UNITED STATES PATENTS

| | | | |
|---|---|---|---|
| 2,381,847 | 8/1945 | Ullrich | 179/15 BA |
| 3,202,762 | 8/1965 | Aaron et al. | 179/15 BA |
| 3,261,919 | 7/1966 | Aaron et al. | 179/15 BA |
| 3,261,920 | 7/1966 | Aaron | 340/172 X |
| 3,329,774 | 7/1967 | Bradmiller | 179/15 BA |
| 3,686,635 | 8/1972 | Millington et al. | 340/171 R |

OTHER PUBLICATIONS

Lecture Notes, Third Edition, Digital Communication, RCA Institutes, 1966, 1967, 1968, pp. 1.7–1.11.

Lecture Notes, Third Edition, Digital Communications, RCA Institutes, 1966, 1967, 1968, p. 1.7.

*Primary Examiner*—Howard W. Britton
*Assistant Examiner*—Aristotelis M. Psitos
*Attorney, Agent, or Firm*—Edward L. Schwarz

[57] ABSTRACT

The synchronizing and data signals for the displaying of data on the face of a video display unit are multiplexed into one composite signal by the use of voltage summing apparatus. The composite signal is transmitted on a single coaxial cable to the remotely located display unit where the original signals are reconstructed by circuits sensitive to frequency, level, or both.

4 Claims, 9 Drawing Figures

INVENTORS
HOWARD N. SEIM
NEAL E. ROEBKE
BY
Paul L. Sjoquist
ATTORNEY

INVENTORS
HOWARD N. SEIM
NEAL E. ROEBKE
BY
Paul L. Sjoquist
ATTORNEY

INVENTORS
HOWARD N. SEIM
NEAL E. ROEBKE
BY
Paul L. Sjoquist
ATTORNEY

SIGNAL MULTIPLEXER AND DEMULTIPLEXER

This disclosure relates to the transmission of digital pulse trains and more particularly to the transmission of digital pulse trains for controlling the generation of alphanumerics in a video display unit. Normally, this is accomplished by transmitting each of these signals over a separate cable. Each must be shielded from interference, necessitating shielded cable of the coaxial type. Coaxial cable, when used in the lengths of several thousand feet that are often involved, becomes a significant factor in the total expense of the display unit.

Accordingly, it is an object of this invention to form one composite signal containing all the information that is contained in the individual pulse trains controlling movement and intensity of an electron beam sweeping the face of a cathode ray tube (CRT) display unit.

Another object is to replace the individual conductors of such pulse trains with one conductor.

A third object is to reduce the volume occupied by the cabling used in connecting a display unit with its data source.

Another object is to simplify connection of such coaxial cable.

Video display units have long been used in conjunction with computers for displaying computer generated data to humans. Due to the relatively low "data rate" (vis-a-vis computers) of which humans are capable, a single computer is capable of feeding data to many humans via video display units. A very common procedure, rather than using a relatively expensive and fast computer input-output channel to service a single display unit, is to use a single controller unit, communicating with one computer channel, to supply the timing and data signals to many display units simultaneously. In one design, four different signals must be simultaneously transmitted to each display unit from the controller. Three signals comprise timing or synchronizing pulses, and a fourth signal supplies so-called "unblanking" pulses for enabling and disabling spot generation on the CRT screen. The vertical timing signal supplies a pulse which resets the electron beam deflection circuitry to direct the spot to the topmost line of characters. The horizontal timing signal causes deflection of the beam to the left hand side of the screen. The diddle timing signal controls the vertical sweep of the spot down each line comprising one vertical column of dots in a raster matrix and resetting of the spot for the next raster column. The video signal, by enabling and disabling the flow of electrons along the deflected beam, creates a raster image of the desired character.

In forming the composite signal, each pulse train is first voltage amplified by a line driver. The amplified pulse train passes through a resistor and a diode forward biased by each pulse. The output terminal of each resistor-diode combination is connected to the inner conductor of the coaxial cable. Resistors connect the inner and outer conductors of the coaxial cable to each other at each end. One output terminal of each amplifier is grounded, as is each end of the coaxial cable. The diodes serve to isolate each amplifier from every other amplifier. By forming all the pulse trains from positive pulses, the occurrence of any pulse will increase the value of the composite signal being transmitted on the coaxial cable. The operation is analagous to connecting and disconnecting several voltage sources operating through a common load impedance. Connection corresponds to a positive going voltage change and disconnection corresponds to a return of the signal to zero, each diode acting like an open circuit as to the signal from the other resistor-diode combinations.

The composite signal is received by signal separator circuitry at the terminal end of the coaxial cable. Each pulse train can be distinguished from every other pulse train, either because the pulse frequency is greatly different from that of any other pulse train, or because the voltage level of the composite signal at the time of the pulse is much different from the voltage level at other times. Circuits using well-known techniques choose the desired signal and reject all others. Regenerative circuits can then recreate the original signals with enough power to drive them the short distance to the electron beam control circuitry.

Figures 3A, 3B, 4A, 4B, 5A, 5B:
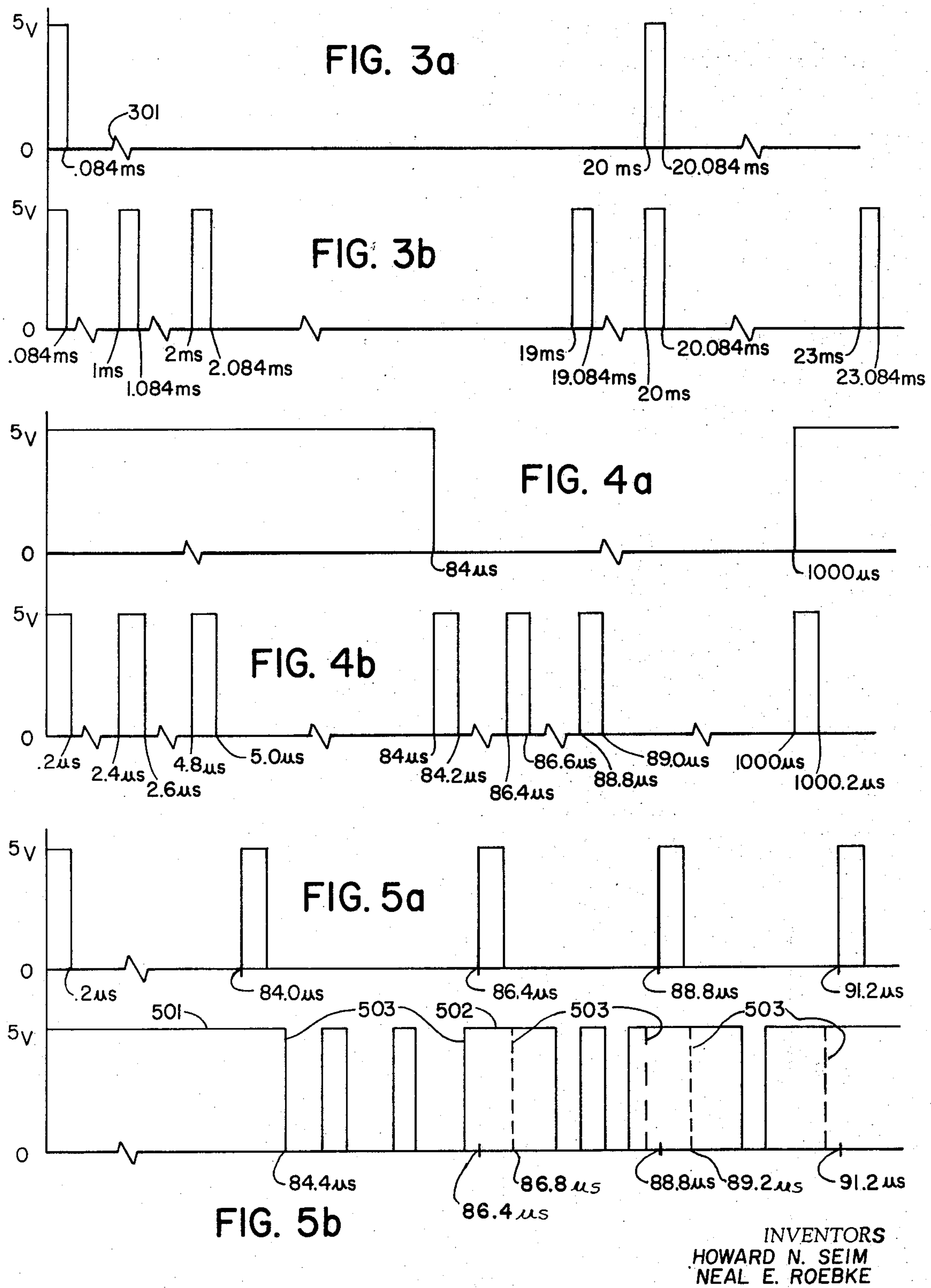

FIG. 3*a* is a graph of a vertical signal voltage versus time.

FIG. 3*b* is a graph of a horizontal signal voltage versus time.

FIG. 4*a* is a graph of a horizontal signal voltage versus time on a longer time scale than that of FIG. 3*a*.

FIG. 4*b* is a graph of a diddle signal voltage versus time, the time scale being the same as that in FIG. 4*a*.

FIG. 5*a* is a graph of a diddle signal voltage versus time on a longer time scale than that of FIG. 4*b*.

FIG. 5*b* is a graph of representative video (unblank) signal voltage pulses versus time, the time scale being the same as in FIG. 5*a*.

Figure 6:
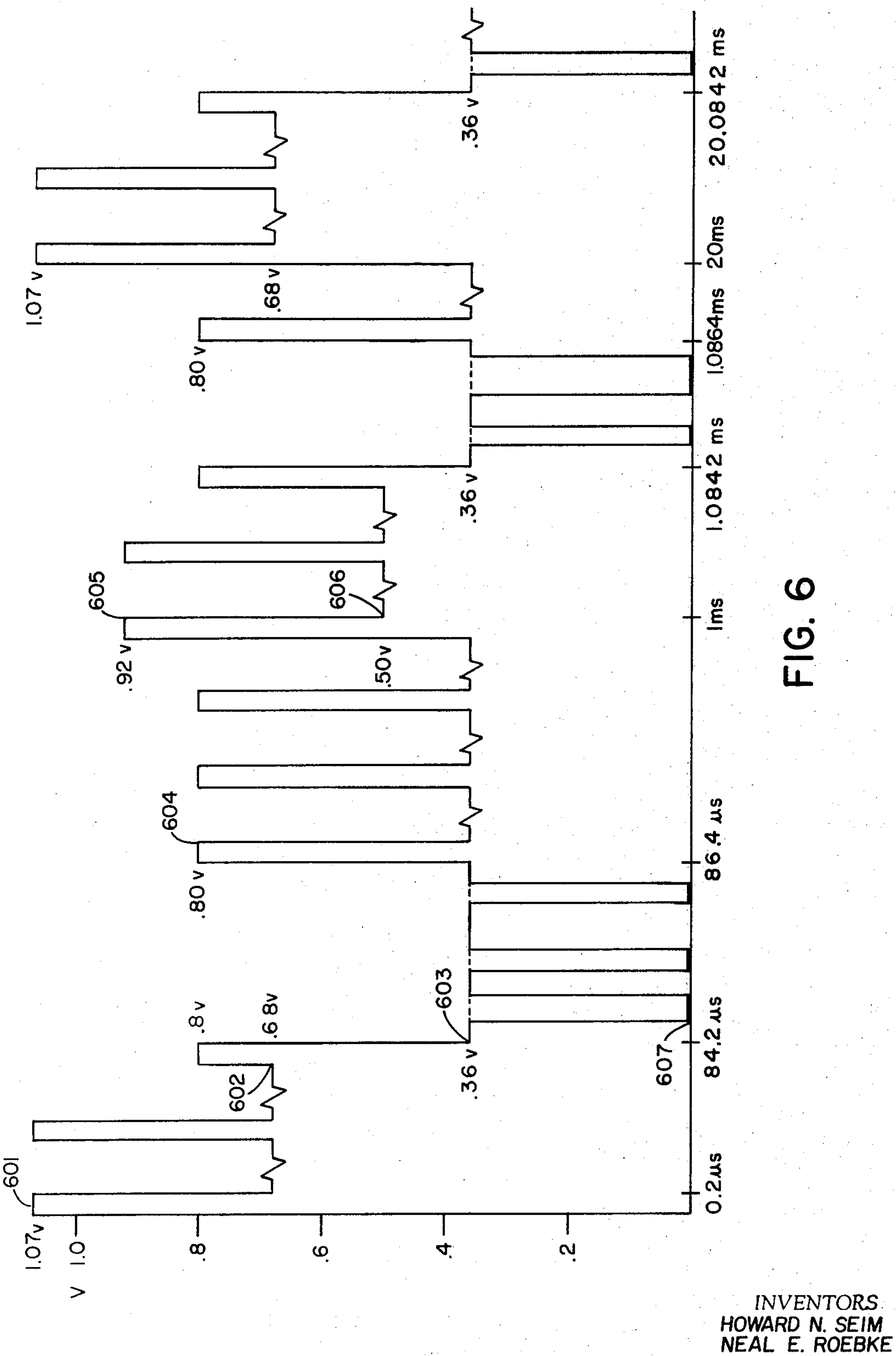

FIG. 6 is a graph of composite signal voltage versus time.

FIGS. 3*a*, 3*b*, 4*a*, 4*b*, 5*a*, and 5*b* set out the frequency and pulse width differences between the four types of pulses in the specific application just previous to the time they are to be combined as a single signal. In the display equipment utilizing this invention, the vertical control signal shown in FIG. 3*a* is comprised of 84 usec., + 5 v. square pulses whose leading edges are 20 msec. apart. The horizontal control pulses shown in FIG. 3*b* and FIG. 4*a* have 84 usec. + 5 v. square pulses with leading edges 1 msec. apart. As shown by FIGS. 3*a* and 3*b*, each vertical pulse is contemporaneous with every twentieth horizontal pulse. All symbols 301 indicate a graphically telescoped time scale. FIGS. 4*a* and 4*b* show the relationship between each horizontal pulse and the diddle pulse train. Each diddle pulse is 0.2 usec. wide with the leading edge of each 2.4 usec. from the preceding one. The diddle pulse train is resynchronized with the leading edge of each horizontal pulse so as to cause the leading edges of a diddle pulse to correspond with the leading edges of a horizontal pulse. The video pulse train, shown in FIG. 5*b*, is synchronized with the diddle pulses shown in FIG. 5*a*. (It must be realized that it is but one of many possible video trains.) From 0 to 9 zero-going video pulses can occur from 0.4 usec. after the leading edge of a diddle pulse through 0.2 usec. before the leading edge of the next diddle pulse. No video pulses occur during horizontal and vertical pulses, since these times are required to reset the deflection circuitry to direct the electron beam in position for starting a new line or scan. When the video voltage is at + 5 v. the beam (and spot produced by it)

is blanked out by the control circuitry. If two or more spots in succession are required, the video signal voltage will stay at 0 v. until the beam requires blanking again. Thus it can be seen that the video signal is the only data (as opposed to the horizontal, vertical, and diddle pulses which are for timing purposes) signal. At times when no timing signals occur, video signals comprising pulses which are of uncertain length occurring at unpredictable times are present, the exact characteristics depending on the particular characters whose creation they control on the video screen itself. Because of this irregularity in the duration and time of occurance of these pulses, they are aperiodic, the term being used in its ordinary dictionary sense of "being of irregular occurance" or "not having periodic vibrations." Portion 501 of the video signal indicates its value during horizontal as well as other timing pulses. The portion 502 indicates its value during and 0.2 usec. before and 0.2 usec. after a diddle pulse. The time intervals between each pair of lines 503 are the times when a video signal is permitted to be 0 v. (unblanked). Thus the video signal will be a direct current signal of + 5 v. if all spots are being blanked. The video frequency can go momentarily as high as 2.5 mhz. if every second spot is being blanked. In FIG. 5*b*, in the time intervals between 84.4 and 86.2 usec. between 86.8 and 88.6 usec. and between 89.2 and 91.0 usec. three of the 512 (nine binary pulses between each pair of diddle pulses) possibilities are shown. It can thus be appreciated that during these time intervals, an individual pulse may be as short as 0.2 usec. or as long as 1.8 usec. and are thus of irregular duration. A pulse may occur at any 0.2 usec. interval starting at 0.4 usec. after the leading edge of a diddle pulse through 0.4 usec. before the leading edge of the next diddle pulse, and thus occur at irregular times as well. FIG. 6 between 84.4 and 86.2 usec. and between 1.0844 and 1.0862 usec. displays other possibilities for video signals. This knowledge of the characteristics of the signals involved is useful in understanding the operation of the multiplexing apparatus which will now be described.

Figure 1:
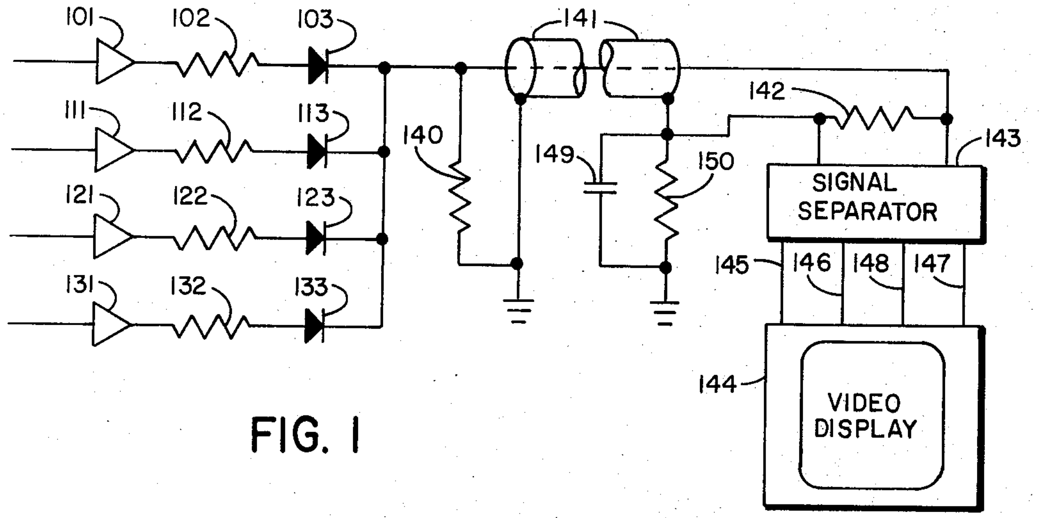
FIG. 1 is a combination schematic and block diagram of the apparatus embodying the invention.

FIG. 1 shows the multiplexing circuitry in schematic form and the demultiplexing or demodulating circuitry in block form. Diddle pulses are fed to amplifier 101. Resistor 102 and diode 103 are connected in series between the inner conductor of coaxial cable 141 and the output terminal of amplifier 101, diode 103 being forward biased by each diddle pulse. In like manner amplifier 111 receives the horizontal pulses. Resistor 112 and diode 113 connect the output terminal of amplifier 111 and the center conductor of coaxial cable 141, diode 113 being forward biased by each horizontal pulse from amplifier 111 similar to the forward biasing of diode 103. Amplifier 121 receives the vertical pulses, which are similarly connected through resistor 122 and diode 123 to the center conductor of coaxial cable 141. Amplifier 131 receives the video signals and applies them to coaxial cable 141 through resistor 132 and diode 133. Diode 133 is forward biased by the positive (blanking) portion of the video signal. Equal valued resistors 140 and 142 connect the inner conductor to the outer conductor of coaxial cable 141 at each end. The aforementioned amplifiers have an unshown terminal also grounded, completing the electrical circuit. Signal separator 143 is connected to the terminal end of the inner conductor of coaxial cable 141 and to ground through the filter comprising capacitor 149 in parallel with resistor 150, thereby completing the electric circuit of the composite signal. Four conductors, 145, 146, 147 and 148, supply the four signals to the CRT control unit after separation and amplification.

Amplifiers 101, 111, 121 and 131 produce an output of five volts if the signal pulse is to be high and 0 volts if the signal pulse is to be low. If during some time the output of all four amplifiers is at 5 volts, the voltage applied to coaxial cable 141 can be simply calculated by application of electrical laws. For ease in performing representative calculations, preferred values will be assigned to the components in the summing circuit.

| | |
|---|---|
| Resistor 102 | 330 ohms |
| Resistor 112 | 1200 ohms |
| Resistor 122 | 820 ohms |
| Resistor 132 | 510 ohms |
| Resistor 140 | 91 ohms |
| Resistor 142 | 91 ohms |

All diodes have forward voltage drops of 0.6 volt.

Referring to FIG. 6, the part of the graph labeled 601 and similar portions represent voltage across resistors 140 and 142 of FIG. 1 when amplifiers 101, 111, 121, and 131 all have outputs of + 5 v. In determining the voltage at point 601, we can treat the resistor network of FIG. 1 as having 4.4 volt signals (5v − 0.6*v* diode drop) applied to the terminals and the diodes short-circuited. The equivalent resistance of the parallel resistors 102, 112, 122, and 132 is then given by 1/1/330 + 1/1200 + 1/820 + 1/510 = 142 ohms. The equivalent resistance of resistor 140 and resistor 142 is, neglecting resistance in the coaxial cable, 45.5 ohms. The voltage drop equation through the circuit comprised of one 4.4 voltage source and two equivalent resistances of 142 and 45.5 ohms is given by 4.4 − 142 *v*/45.5 − *v* = 0, where *v* is the voltage across resistor 140. Solving for *v* we get the voltage indicated at 601 in FIG. 6, viz., 1.07 volts. To compute the voltage at 605, which occurs when amplifiers 101, 111, and 131 all have + 5*v* outputs, the equivalent resistance of resistors 102, 112, and 132 must be determined. The effect of the 0 volt output of vertical pulse amplifier 121 can be ignored since diode 123 is back biased, thereby adding effectively an infinite resistance in parallel with the other resistors. The equivalent resistance is 1/1/330 + 1/1200 + 1/510 = 172 ohms. Substituting 172 ohms for 142 ohms in the previous equation involving *v* yields a voltage across resistor 140 of 0.92 volts, as indicated at 605 of FIG. 6. Similar calculations yield the other voltages shown on FIG. 6. At 602 the combination of vertical, horizontal and video amplifier voltages (amplifiers 111, 121, 131) is shown as 0.68 volts. The effect of the video signal alone (amplifier 131) is shown at 603 to be 0.36 volts. The combination of diddle and video voltages (amplifiers 101, 131) is shown at 604 to be 0.80 volts. When all amplifiers have 0 v. output the signal is as shown at 607.

The signal separator, 143 in FIG. 1, receives the composite signal of FIG. 6 appearing as a voltage across resistor 142. Capacitor 149 and resistor 150 are inserted to remove any 60 hz. signal induced in the outer conductor. Capacitor 149 is in the range of 0.1 ufd. and furnishes almost no impedance to 60 hz. Resistor 150, which can be 10,000 ohms, assists in removing 60 hz. signals also.

Figure 2:
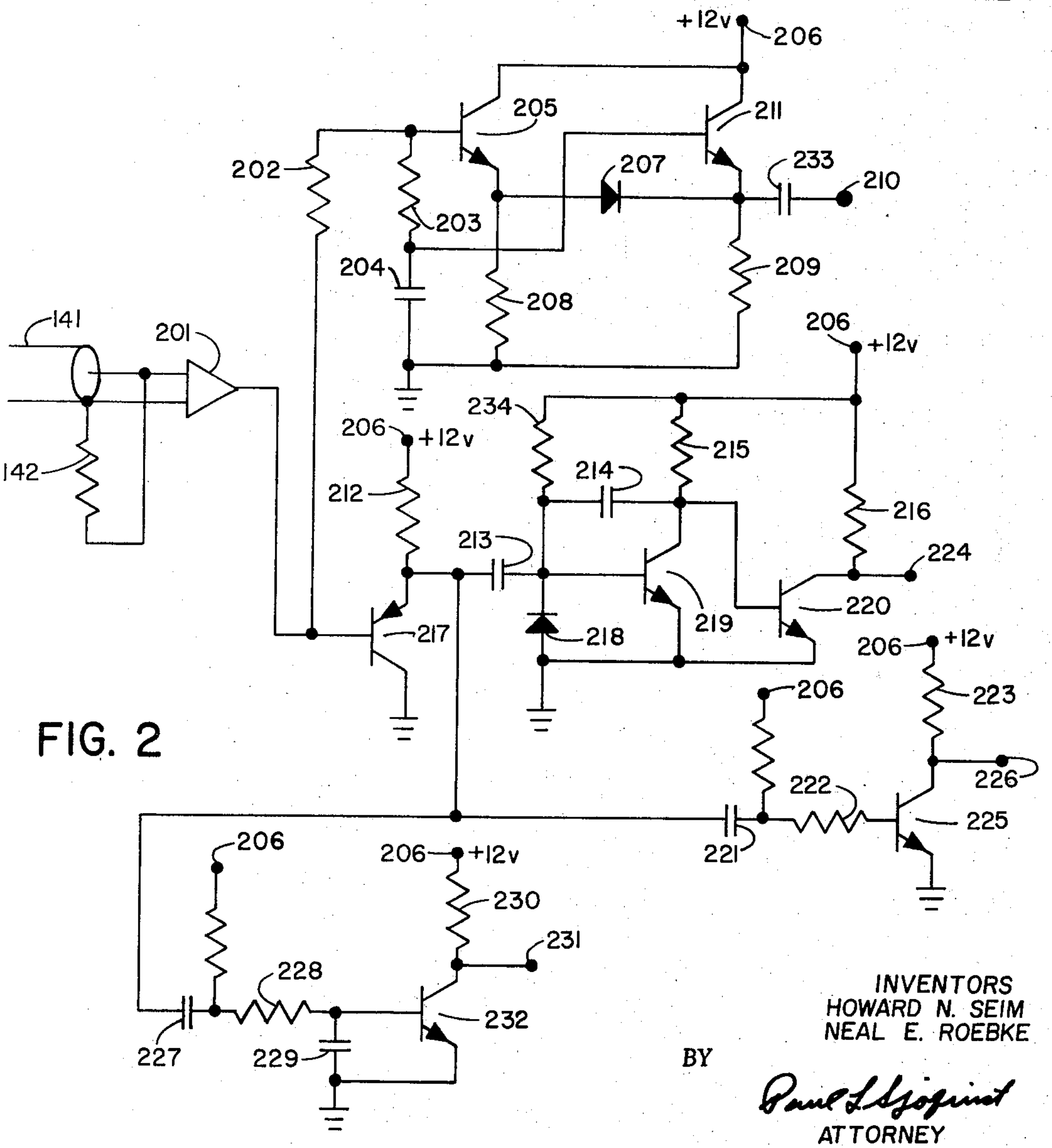
FIG. 2 is a schematic of the signal separator circuitry.

FIG. 2 shows signal separator 143 in schematic detail. Amplifier 201 receives the voltage signal across resistor 142 and inverts and amplifies it. The inverted and amplified signal has a positive excursion of 7 volts corresponding to a 0 volt video signal as shown at 606 of FIG. 6. The most negative excursion of the amplifier is about + 4 volts, corresponding to the presence of 5 volt signals at the output terminals of amplifiers 101, 111, 121, and 131 of FIG. 1 as shown at 601 of FIG. 6. Other voltage levels shown in FIG. 6 are at corresponding inverted levels.

Four separate sub-circuits are present in FIG. 2. The circuitry connected from the output of amplifier 201 by resistor 202 performs video extraction. Those connected to the emitter of transistor 217 by capacitors 213, 221 and 227 perform diddle, horizontal, and vertical signal extraction, respectively. The signal on which this extraction is performed is displayed in FIG. 6 and represents the weighted summation of the four signals displayed in FIGS. 3*a* through 5*b*. Thus, the 1.07 v. signal at point 601 indicates the presence of diddle, vertical, and horizontal pulses and the absence of a video pulse (since video pulses are negative-going, as shown in FIG. 5*b*). The 0.68 v. signal at point 602 represents the sum of a vertical and a horizontal signal. The voltages at all the signal points labeled with reference numerals can be summarized as:

| Ref. Numeral | Signals Present |
|---|---|
| 601 | Vertical, horizontal, diddle |
| 602 | Vertical, horizontal |
| 603 | None (video pulses are negative-going) |
| 604 | Diddle only |
| 605 | Diddle, horizontal |
| 606 | Horizontal only |
| 607 | Video only (see comment for ref. no. 603) |

In understanding the circuit of FIG. 2, it is helpful to keep in mind that video signals are separated on the basis of voltage alone. Video signals are most easily extracted by voltage discrimination since a negative-going video pulse is never coincident with a timing pulse, and since video pulse frequence can vary from close to 0 hz to 2.5 mhz depending on the number of video pulse occurs every 400 nsec., i.e., every other spot on the CRT is painted, the frequency is the 2.5 mhz maximum. Diddle and vertical signals are extracted using both frequency and voltage level discrimination. Horizontal is separated on the basis of frequency characteristics only.

The circuitry associated with transistor 205 and transistor 211 is used to extract the video signals. The output of amplifier 201 is fed through 1,000 ohm resistor 202. The signal further travels through resistor 203, which ideally has a resistance of 6,800 ohms. The A.C. component of this signal travels unimpeded through capacitor 204 to ground, since capacitor 204 has a large value, say of 15 ufd. The D.C. component of the signal will charge capacitor 204 to a voltage level then constantly applied to the base of transistor 211. When no video is present the voltage across capacitor 204 will hold the emitter terminal voltage of emitter-follower transistor 211 approximately one forward diode voltage drop (the base-emitter junction of transistor 211) below the D.C. voltage component of the signal after it has passed through resistor 203. Occurrence of video signals will not significantly vary the voltage across capacitor 204. Due to the choice of component values already described, each unblanking video pulse will increase the base voltage of transistor 205 to more than two diode drops above the emitter of transistor 211, biasing transistor 205 into conduction. The pulse so caused travels through diode 207 to capacitor 233. Capacitor 233 (15 ufd.) blocks the D.C. component of this pulse from transistor 205 but allows the A.C. component to pass easily through to terminal 210. The choice of component values is made so that only video pulses, being the most positive pulses in the inverted signal, will forward bias the base-emitter junction of transistor 205, causing it to conduct. All other signals will hold the base of transistor 205 at or below its cutoff voltage point. This voltage discriminator circuit therefore detects the video pulses and rejects all other pulse trains in the signal. The output is inverted, but inversion of the video signal appearing at terminal 210 and amplification of it to logic levels are simple matters for one skilled in such arts.

The signal from amplifier 201 is also applied to the base of emitter follower transistor 217. The signal appearing at the emitter terminal of transistor 217 will therefore be approximately one diode voltage drop above the signal from inverting amplifier 201. The output of transistor 217 is led to capacitor 213, ideally of 0.001 ufd., for extraction of the diddle pulses. This size is chosen because it is sufficient to block the vertical and horizontal signal components still present in the composite signal, but will furnish little impedance for the diddle and video components.

It is also necessary to suppress the video pulses still present. Resistor 234 biases transistor 219 into almost complete conduction when neither the positive-going video pulses nor the negative-going diddle pulses are present. The leading edge of video pulses applied to its base will not significantly change the small voltage across the collector and emitter of transistor 219. When the trailing edge of a video pulse attempts to swing the base negative, undesirable characteristics may appear, however. But for capacitor 214, ideally of 47 pfd., transistor 219 will become partially cut off during these negative-going swings. Dynamic response characteristics of transistors cause such partial cutoff during negative-going transition stages even though the transistor returns to full conduction as soon as base voltage stabilizes. Capacitor 214 utilizes the Miller effect to oppose this partial cutoff tendency. Thus the video pulses are not allowed past transistor 219.

When the base of transistor 219 is swung more negative by the leading edge of a diddle pulse, capacitor 214 acts to filter any high-frequency noise components that may exist along the leading edge. The result of this action is that the negative-going pulse smoothly transitions transistor 219 into a nonconducting state. When the trailing edge of the diddle pulse later attempts to swing the base of transistor 219 positive, it will be opposed by capacitor 214. Capacitor 214, by slowing the change in base voltage, functions as a Miller integrator and smooths the return of transistor 219 to its wholly conductive state. The increased voltage across the collector-emitter terminal of transistor 219 caused by each diddle pulse increases the base voltage of transistor 220 a few tenths of a volt above the point it is normally held by resistor 215 (ca. 1,600 ohms) acting along. This additional voltage biases transistor 220 into conduction. Since transistor 220 is chosen from those having a very narrow partial conduction zone, its output in response to such a voltage increase will be a very fast change from non-conduction to conduction and a corresponding step voltage change at terminal 224. When transistor 219 later becomes wholly conductive again, transistor 220 will return to non-conduction, terminating the detection of a diddle pulse.

The output of transistor 217 is also led to capacitor 221 for detecting the horizontal signals. Capacitor 221, of 15 ufd., blocks the D.C. component of the signal, but allows all A.C. components to pass through unopposed. Transistor 225 is chosen to have slow switching characteristics, which gives a several microsecond lag in changing its impedance in response to a change in base potential. Thus it completely ignores the diddle and video components of the signal and changes impedance only for vertical and horizontal signals pulses. Resistor 222, of 1,000 ohms, provides current limiting for the base of transistor 225. Since the vertical pulses always correspond with a horizontal pulse, it is not necessary to discriminate between them when detecting horizontal pulses.

In detecting vertical pulses the output of transistor 217 is again led through a large 15 ufd. capacitor, 227, which blocks all D.C. components of the signal. Resistor 228, of 2,000 ohms, is twice as large as resistor 222 in the horizontal extraction circuitry. This resistor, in conjunction with capacitor 229, 470 pfd., reduces incoming signals and shunts the major portion of the horizontal pulses to ground. The value for resistor 228 is chosen so that only a composite horizontal and vertical signal will completely cut off transistor 232. Thus a positive-going pulse appears at terminal 231 each time a vertical pulse occurs in the composite pulse train.

None of the four outputs have a desirable logic level voltage. The video and diddle outputs are inverted. Pulse shapes are not square. To correct this, video and diddle outputs are lead to one-shots which provide proper logic level pulses of the proper shape. Each one-shot is designed to provide the proper pulse width as well. Furthermore, each one-shot is chosen to have a threshold always causing the one-shot to respond to the desired signal, and always preventing its response to signal variations caused by imperfect elimination of the undesired signals. Such selections are simple for those skilled in the art of electronics. The outputs from these two one-shots then correspond almost exactly to the video and diddle inputs combined by the circuitry in FIG. 1. These one-shot outputs can then be used to control the operation of the CRT display unit.

While the horizontal and vertical signal outputs could be used to trigger one-shots, in the actual design they are lead directly to ramp generators, not shown, which are known in the art. The ramp generator outputs are amplified and used to drive the associated deflection yokes which direct the beam across the face of the CRT.

Having thus described circuits capable of combining a plurality of CRT control signals and separating the same, but not wanting to be limited to the specific circuit embodiments described, what we claim is:

1. Improved apparatus for supplying at a remote site the information content of at least three pulse trains, the first and second of the trains comprising respectively, periodic timing pulses of relatively low and high frequencies and whose pulses on occasion coincide, and the third pulse train comprising aperiodic data pulses of varying duration occurring between the timing pulses, wherein the improvement comprises:

a. means receiving the pulse trains for providing a composite signal following the instantaneous sum of voltages of said pulse trains; and b. separating means for receiving the composite signal and reproducing from the composite signal a plurality of signals, each comprising pulses corresponding to the pulses in one original pulse train, comprising i. level sensing means for producing a data signal pulse whenever composite signal voltage reaches a predetermined value;

ii. frequency-tuned means for producing timing pulses corresponding to those of the first timing pulse train; and iii. means reproducing the second timing pulse train for attenuating all composite signal frequency components outside a predetermined bandwidth surrounding the frequency of the second pulse train, and producing a pulse of the second train each time signal voltage falls within a predetermined range.

2. The apparatus of claim 1 wherein the means for reproducing the second pulse train comprises a capacitor receiving the composit signal and substantially blocking the lower frequency timing signals, and a transistor receiving the capacitor output and remaining in a first conduction state between the data pulses and entering a second conduction state responsive to each pulse of the second timing pulse train.

3. The apparatus of claim 1 wherein said composite signal providing means comprises a plurality of first resistance means, each for receiving one of said voltage pulse trains; a plurality of diodes, each receiving a pulse train from one of said first resistance means and being forward biased thereby; and second resistance means commonly connected to all of said diodes for providing a pulse train return path.

4. The apparatus of claim 1 wherein said composite signal providing means includes means for weighting the effect of at least one voltage pulse train on the composite signal by a predetermined amount.

* * * * *